(12) United States Patent
Savant

(10) Patent No.: US 9,692,776 B2
(45) Date of Patent: Jun. 27, 2017

(54) SYSTEMS AND METHODS FOR EVALUATING CONTENT PROVIDED TO USERS VIA USER INTERFACES

(71) Applicant: Symantec Corporation, Mountain View, CA (US)

(72) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 14/698,885

(22) Filed: Apr. 29, 2015

(65) Prior Publication Data
US 2016/0323307 A1    Nov. 3, 2016

(51) Int. Cl.
*G06F 7/04* (2006.01)
*G06F 15/16* (2006.01)
*G06F 17/30* (2006.01)
*H04L 29/06* (2006.01)
*G06F 21/62* (2013.01)
*G06F 3/0484* (2013.01)

(52) U.S. Cl.
CPC ...... *H04L 63/1425* (2013.01); *G06F 3/04842* (2013.01); *G06F 21/6218* (2013.01); *H04L 63/20* (2013.01); *G06F 2221/2119* (2013.01); *G06F 2221/2149* (2013.01)

(58) Field of Classification Search
CPC ..... H04L 63/20; H04L 63/10; H04L 63/1416; H04L 63/08; H04L 63/1425
USPC .......................................................... 726/1
See application file for complete search history.

(56) References Cited

U.S. PATENT DOCUMENTS 6,282,709 B1    8/2001  Reha et al.
2002/0122051 A1   9/2002  Hose et al.
(Continued)

FOREIGN PATENT DOCUMENTS

WO    WO-00/60488    10/2000

OTHER PUBLICATIONS

Christopher Woodward; Systems and Methods for Detecting Advertisements Displayed to Users via User Interfaces; U.S. Appl. No. 14/812,707, filed Jul. 29, 2015.
(Continued)

*Primary Examiner* — Kambiz Zand
*Assistant Examiner* — Stephen Sanders
(74) *Attorney, Agent, or Firm* — FisherBroyles LLP

(57) ABSTRACT

The disclosed computer-implemented method for evaluating content provided to users via user interfaces may include (1) monitoring, as part of a security application via an accessibility application program interface provided by an operating system of a computing device, accessibility events that indicate state transitions in user interfaces of applications running on the computing device, (2) receiving, at the security application, an accessibility event that indicates that a user of the computing device is viewing a user interface of an application running on the computing device, (3) identifying, as part of the security application via the accessibility application program interface, content that the user is attempting to access via the application, (4) determining, as part of the security application, that the content is harmful, and (5) performing, as part of the security application, at least one security action in response to determining that the content is harmful.

20 Claims, 9 Drawing Sheets

(56) References Cited

U.S. PATENT DOCUMENTS

| | | |
|---|---|---|
| 2006/0242712 A1 | 10/2006 | Linn et al. |
| 2010/0229220 A1 | 9/2010 | Tsai |
| 2011/0047620 A1 | 2/2011 | Mahaffey et al. |
| 2011/0154490 A1 | 6/2011 | DeLuca et al. |
| 2012/0173699 A1 | 7/2012 | Niemel |
| 2012/0243043 A1 | 9/2012 | Asai |
| 2012/0246630 A1 | 9/2012 | Kuzins et al. |
| 2013/0247021 A1 | 9/2013 | You |
| 2013/0254880 A1 | 9/2013 | Alperovitch et al. |
| 2013/0283377 A1 | 10/2013 | Das et al. |
| 2013/0333039 A1 | 12/2013 | Kelly |
| 2013/0340089 A1* | 12/2013 | Steinberg ............... H04L 63/10 726/27 |
| 2014/0090077 A1 | 3/2014 | Jeong et al. |
| 2014/0096246 A1 | 4/2014 | Morrissey et al. |
| 2014/0109186 A1 | 4/2014 | Oikonomidis |
| 2014/0317610 A1 | 10/2014 | Belfoure et al. |
| 2015/0180746 A1* | 6/2015 | Day, II .................... H04L 51/16 455/405 |

OTHER PUBLICATIONS

Ramakrishnan Meenakshi Sundaram; Systems and Methods for Enabling Parental Control Applications to Enforce Rules on Third-Party Applications; U.S. Appl. No. 14/817,236, filed Aug. 4, 2015.

Jonathon Salehpour; Systems and Methods for Detecting When Users Are Uninstalling Applications; U.S. Appl. No. 14/824,539, filed Aug. 12, 2015.

Ramakrishnan Meenakshi Sundaram; Systems and Methods for Protecting Computing Devices From Imposter Accessibility Services; U.S. Appl. No. 14/837,383, filed Aug. 27, 2015.

"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).

"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).

"PackageInstaller", https://developer.android.com/reference/android/content/pm/PackageInstaller.html, as accessed Jun. 25, 2015, Android Developers, (Oct. 20, 2014).

"AccessibilityService", http://developer.android.com/reference/android/accessibilityservice/AccessibilityService.html, as accessed Jun. 25, 2015, Android Developers, (Nov. 15, 2009).

"Developing an Accessibility Service", http://developer.android.com/training/accessibility/service.html, as accessed Jun. 25, 2015, Android Developers, (Apr. 13, 2012).

"AlertDialog", http://developer.android.com/reference/android/app/AlertDialog.html, as accessed Jun. 25, 2015, Android Developers, (Feb. 18, 2009).

"Artimys", https://artimysapi.appspot.com/, as accessed Jun. 4, 2015, (2013).

Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).

"Android.accessibilityservice", https://developer.android.com/reference/android/accessibilityservice/package-summary.html, as accessed Jun. 4, 2015, Android Developers, (Sep. 22, 2009).

Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).

"Adblock Plus", https://adblockplus.org/, as accessed Jun. 4, 2015, (Aug. 21, 2006).

"AccessibilityEvent", http://developer.android.com/reference/android/view/accessibility/AccessibilityEvent.html, as accessed Jun. 4, 2015, Android Developers, (Oct. 10, 2009).

"Sending Simple Data to Other Apps", http://developer.android.com/training/sharing/send.html, as accessed Jan. 7, 2014, (Jan. 4, 2012).

"Google Play", http://en.wikipedia.org/wiki/Google_Play, as accessed Jan. 7, 2014, Wikipedia, (Mar. 7, 2012).

Anubhav Savant; Systems and Methods for Informing Users About Applications Available for Download; U.S. Appl. No. 14/178,279, filed Feb. 12, 2014.

Zeqing Qi, et al; Systems and Methods for Updating Applications; U.S. Appl. No. 14/305,497, filed Jun. 16, 2014.

Anubhav Savant; Systems and Methods for Providing Information Identifying the Trustworthiness of Applications on Application Distribution Platforms; U.S. Appl. No. 14/338,539, filed Jul. 23, 2014.

Anubhav Savant, et al; Systems and Methods for Modifying Applications Without User Input; U.S. Appl. No. 14/445,704, filed Jul. 29, 2014.

"ApplicationId versus PackageName", http://tools.android.com/tech-docs/new-build-system/applicationid-vs-packagename, as accessed Mar. 3, 2015, Android Tools Project Site, (Oct. 3, 2014).

Beal, Vangie "API—application program interface", http://www.webopedia.com/TERM/A/API.html, as accessed Mar. 3, 2015, Webopedia, (Jun. 21, 2000).

"AccessibilityEvent", http://developer.android.com/reference/android/view/accessibility/AccessibilityEvent.html, as accessed Mar. 3, 2015, Android Developers, (Oct. 10, 2009).

"Greenify", https://play.google.com/store/apps/details?id=com.oasisfeng.greenify&hl=en, as accessed May 30, 2014, (Jun. 19, 2013).

"Receiving Simple Data from Other Apps", http://developer.android.com/training/sharing/receive.html, as accessed Jan. 7, 2014, (Jan. 3, 2012).

"Building Accessibility Services", http://developer.android.com/guide/topics/ui/accessibility/services.html, as accessed May 30, 2014, Android, (Apr. 14, 2012).

"Digital distribution", http://en.wikipedia.org/wiki/Digital_distribution, as accessed May 30, 2014, Wikipedia, (Jun. 15, 2005).

"AccessibilityService", http://developer.android.com/reference/android/accessibilityservice/AccessibilityService.html, as accessed May 30, 2014, Android, (Nov. 15, 2009).

* cited by examiner

SYSTEMS AND METHODS FOR EVALUATING CONTENT PROVIDED TO USERS VIA USER INTERFACES

BACKGROUND

Applications running on computing devices may enable users to browse websites, download files, send and receive electronic messages, play online games, and/or access additional services, media, and content. Unfortunately, some applications may enable users to access malicious, inappropriate, or otherwise harmful content. As an example, an electronic messaging service may allow a user to download a malicious file distributed via an email. In another example, an application distribution platform may enable a young child to download an age-inappropriate video or game.

Traditional methods for preventing users from accessing harmful content on their computing devices may involve identifying and evaluating content before a user accesses (e.g., views or downloads) the content. However, some conventional methods for evaluating content may be unable to accurately and/or efficiently identify all content that a user is attempting to access. As an example, a web-monitoring technology may identify websites that a user is visiting on a mobile device by analyzing the browsing history maintained by a web browser application on the device. However, some browsers (e.g., FIREFOX for ANDROID devices, DOLPHIN, OPERA, etc.) may not publish browsing histories. As a result, the web-monitoring technology may be unable to identify websites that a user is viewing, potentially allowing the user to visit harmful sites.

Some technologies for monitoring additional sources of content (e.g., application distribution platforms and messaging applications) may be similarly unable to identify harmful content that a user is attempting to access via applications on their computing devices. The instant disclosure, therefore, identifies and addresses a need for improved systems and methods for evaluating content provided to users via user interfaces.

SUMMARY

As will be described in greater detail below, the instant disclosure describes various systems and methods for evaluating content provided to users via user interfaces by monitoring accessibility events that describe state transitions in user interfaces of applications running on a computing device. As such, the systems and methods described herein may identify harmful content that a user of the computing device is attempting to access via an application running on the computing device.

In one example, a computer-implemented method for evaluating content provided to users via user interfaces may include (1) monitoring, as part of a security application via an accessibility Application Program Interface (API) provided by an operating system of a computing device, accessibility events that indicate state transitions in user interfaces of applications running on the computing device, (2) receiving, at the security application, an accessibility event that indicates that a user of the computing device is viewing a user interface of an application running on the computing device, (3) identifying, as part of the security application via the accessibility API, content that the user is attempting to access via the application, (4) determining, as part of the security application, that the content is harmful, and (5) performing, as part of the security application, at least one security action in response to determining that the content is harmful. In some embodiments, the content may include a link, a keyword, an image, an audio-visual file, and/or a downloadable file.

In some examples, receiving the accessibility event that indicates that the user is viewing the user interface of the application may include receiving an accessibility event that indicates that the user is viewing a user interface of a web browser application. In these examples, identifying the content that the user is attempting to access via the application may include identifying a website that the user is attempting to access via the web browser application. Additionally in these examples, determining that the content is harmful may include determining that the website is known to provide harmful content. Furthermore, in these examples, performing the security action may include preventing the user from accessing the website.

In some embodiments, identifying the content that the user is attempting to access may include (1) identifying, within the accessibility event, text that the user has entered into the user interface of the application and (2) determining that the text identifies the content. In an exemplary embodiment, the text that the user has entered into the user interface of the application may include a Uniform Resource Locator (URL) of a website. In this embodiment, determining that the text identifies the content may include identifying the website.

In some examples, identifying the content that the user is attempting to access may include (1) identifying, within the accessibility event, an element that the user has clicked on within the user interface of the application and (2) determining that the element provides the user with access to the content. In a specific example, the element that the user has clicked on within the user interface may include a link that directs the user to a website. In this example, determining that the element provides the user with access to the content may include identifying the website.

In some embodiments, identifying the content that the user is attempting to access may include (1) querying, via the accessibility API, the user interface of the application to identify an element within the user interface that is known to identify the content and (2) identifying the content within the element. In an exemplary embodiment, the element within the user interface that is known to identify the content may include an address bar of a web browser application into which the user has entered a URL of a website. In this embodiment, identifying the content within the element may include identifying the website.

In some examples, determining that the content is harmful may include querying a remote database to identify a reputation of the content that indicates that the content is harmful. Additionally or alternatively, determining that the content is harmful may include determining that the content violates a security policy, a parental-control policy, and/or an administrative policy.

In some examples, performing the security action may include preventing the user from accessing the content and/or re-directing the user to alternative content. Additionally or alternatively, performing the security action may include notifying the user that the content is harmful and/or notifying an administrator of the computing device that harmful content has been identified.

In one embodiment, a system for implementing the above-described method may include (1) a monitoring module that monitors, as part of a security application via an accessibility API provided by an operating system of a computing device, accessibility events that indicate state transitions in user interfaces of applications running on the computing device, (2) a reception module that receives, at the security application, an accessibility event that indicates that a user of the computing device is viewing a user interface of an application running on the computing device, (3) an identification module that identifies, as part of the security application via the accessibility API, content that the user is attempting to access via the application, (4) a determination module that determines, as part of the security application, that the content is harmful, and (5) a performance module that performs, as part of the security application, at least one security action in response to the determination that the content is harmful. The system may also include at least one processor that executes the monitoring module, the reception module, the identification module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, as part of a security application via an accessibility API provided by an operating system of the computing device, accessibility events that indicate state transitions in user interfaces of applications running on the computing device, (2) receive, at the security application, an accessibility event that indicates that a user of the computing device is viewing a user interface of an application running on the computing device, (3) identify, as part of the security application via the accessibility API, content that the user is attempting to access via the application, (4) determine, as part of the security application, that the content is harmful, and (5) perform, as part of the security application, at least one security action in response to determining that the content is harmful.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
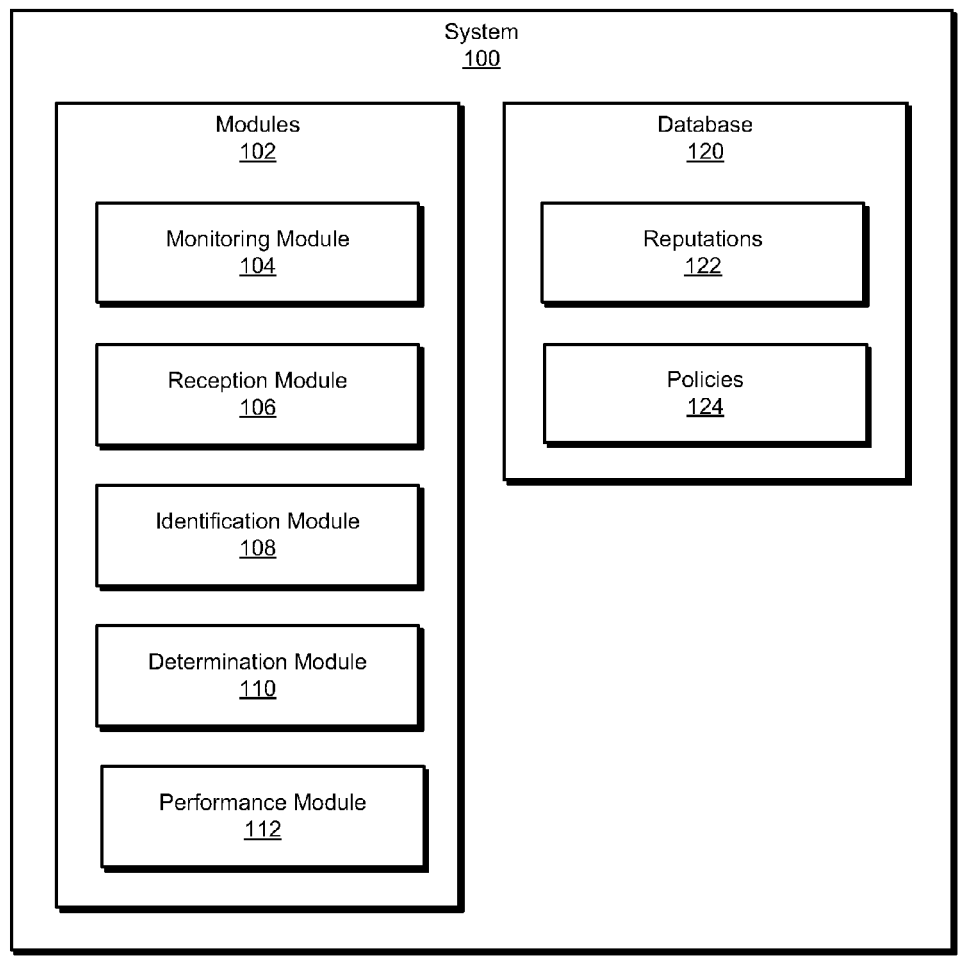
FIG. 1 is a block diagram of an exemplary system for evaluating content provided to users via user interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating content provided to users via user interfaces. As will be explained in greater detail below, by monitoring accessibility events provided by an operating system of a computing device via an accessibility API, the systems and methods described herein may analyze state transitions in user interfaces of applications running on the computing device. Specifically, the disclosed systems and methods may identify state transitions that indicate a user is attempting to access potentially harmful content. For example, the disclosed systems and methods may determine that a user is viewing an inappropriate image, has directed a web browser to load a restricted website, or has clicked on a link to download a malicious file. As such, the disclosed systems and methods may quickly and efficiently identify harmful content that a user is viewing or is about to access and prevent the content from compromising the safety, security, and/or well-being of the user and their computing device.

Figure 2:
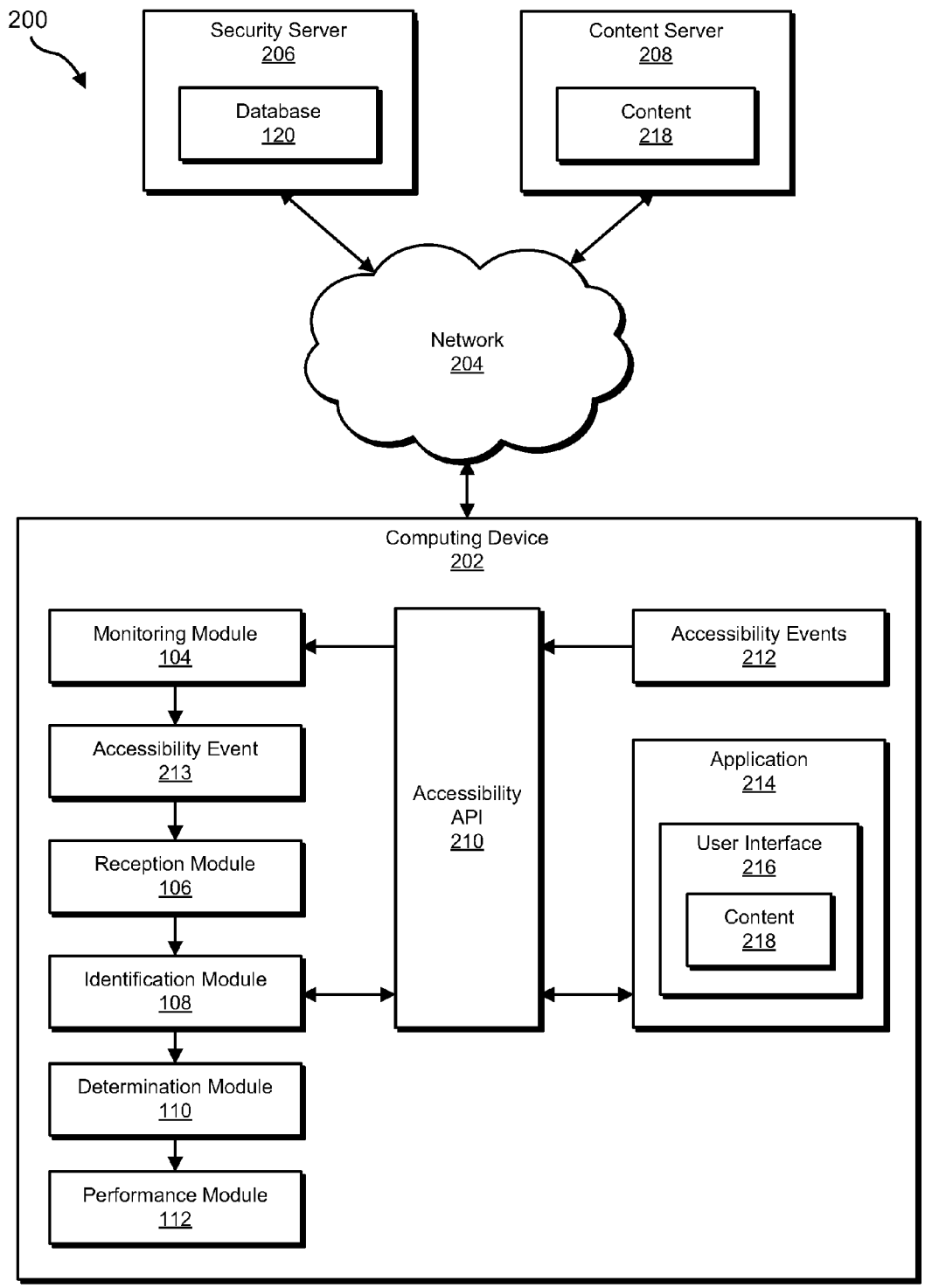
FIG. 2 is a block diagram of an additional exemplary system for evaluating content provided to users via user interfaces.

The following will provide, with reference to FIGS. 1 and 2, detailed descriptions of exemplary systems for evaluating content provided to users via user interfaces. Detailed descriptions of corresponding computer-implemented methods will also be provided in connection with FIG. 3. In addition, detailed descriptions of exemplary accessibility events will be provided in connection with FIGS. 4 and 5. Furthermore, detailed descriptions of exemplary user interfaces will be provided in connection with FIGS. 6 and 7. Finally, detailed descriptions of an exemplary computing system and network architecture capable of implementing one or more of the embodiments described herein will be provided in connection with FIGS. 8 and 9, respectively.

FIG. 1 is a block diagram of an exemplary system 100 for evaluating content provided to users via user interfaces. As illustrated in this figure, exemplary system 100 may include one or more modules 102 for performing one or more tasks. For example, and as will be explained in greater detail below, exemplary system 100 may include a monitoring module 104 that monitors, as part of a security application via an accessibility API provided by an operating system of a computing device, accessibility events that indicate state transitions in user interfaces of applications running on the computing device. Exemplary system 100 may also include a reception module 106 that receives, at the security application, an accessibility event that indicates that a user of the computing device is viewing a user interface of an application running on the computing device.

In addition, and as will be described in greater detail below, exemplary system 100 may include an identification module 108 that identifies, as part of the security application via the accessibility API, content that the user is attempting to access via the application. Exemplary system 100 may also include a determination module 110 that determines, as part of the security application, that the content is harmful. Finally, exemplary system 100 may include a performance module 112 that performs, as part of the security application, at least one security action in response to the determination that the content is harmful. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or security server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store reputations 122. Reputations 122 may represent reputations of content that a user of a computing device is attempting to access. The term "reputation," as used herein, generally refers to any measurement or indication of the security, trustworthiness, or potential harmfulness of a portion of content. In some examples, a reputation of a portion of content may be based on historical data describing malicious or non-malicious behaviors or characteristics of the content. Additionally or alternatively, a reputation of a portion of content may be based on an appropriateness level of the content (e.g., whether the content is appropriate for a workplace or for young children).

In addition, database 120 may be configured to store policies 124. Policies 124 may represent any policies used to determine whether particular content is harmful and/or determine appropriate security actions to perform in response to determining that a user is attempting to access harmful content. The term "policy," as used herein, generally refers to any type or form of rule and/or action used to identify and/or handle harmful content. Examples of policies 124 include, without limitation, security policies, parental-control policies, and administrative policies.

Database 120 may represent portions of a single database or computing device or a plurality of databases or computing devices. For example, database 120 may represent a portion of computing device 202 and/or security server 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as computing device 202 and/or security server 206 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a security server 206 and a content server 208 via a network 204.

In the example of FIG. 2, modules 102 may reside client-side on computing device 202. In this example, modules 102 may identify harmful content that a user of computing device 202 is attempting to access. In another example, one or more of modules 102 may reside server-side on security server 206. In this example, the modules implemented within security server 206 may identify the reputations of content that a user of computing device 202 is attempting to access and/or identify policies to perform in response to determining that a user of computing device 202 is attempting to access harmful content.

Furthermore, in some examples, modules 102 may represent all or a portion of a security application. In these examples, a user or administrator of computing device 202 may download or install the security application onto computing device 202. The security application may then monitor accessibility events provided by an operating system of computing device 202 in order to evaluate the content that a user of computing device 202 is attempting to access. Furthermore, in some embodiments, the security application may operate in conjunction with security server 206. For example, security server 206 may provide or host the security application for download. Additionally or alternatively, security server 206 may be configured to analyze and/or handle potentially harmful content identified by the security application.

In one embodiment, one or more of modules 102 from FIG. 1 may, when executed by at least one processor of computing device 202 and/or security server 206, enable computing device 202 and/or security server 206 to evaluate content provided to users via user interfaces. For example, and as will be described in greater detail below, monitoring module 104 may cause computing device 202 and/or security server 206 to monitor, as part of a security application via an accessibility API 210 provided by an operating system of computing device 202, accessibility events 212 that indicate state transitions in user interfaces of applications running on computing device 202. In addition, reception module 106 may cause computing device 202 and/or security server 206 to receive, at the security application, an accessibility event 213 that indicates that a user of computing device 202 is viewing a user interface 216 of an application 214 that is running on computing device 202. Next, identification module 108 may cause computing device 202 and/or security server 206 to identify, as part of the security application via accessibility API 210, content 218 that the user is attempting to access via application 214. In addition, determination module 110 may cause computing device 202 and/or security server 206 to determine, as part of the security application, that content 218 is harmful. Finally, performance module 112 may cause computing device 202 and/or security server 206 to perform at least one security action in response to the determination that content 218 is harmful.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Security server 206 generally represents any type or form of computing device that is capable of storing reputations of content, analyzing content for harmful characteristics, and/ or providing policies for handling harmful content. In addition, content server 208 generally represents any type or form of computing device that is capable of hosting content and/or providing content to computing devices. Examples of security server 206 and content server 208 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202, security server 206, and/or content server 208.

Figure 3:
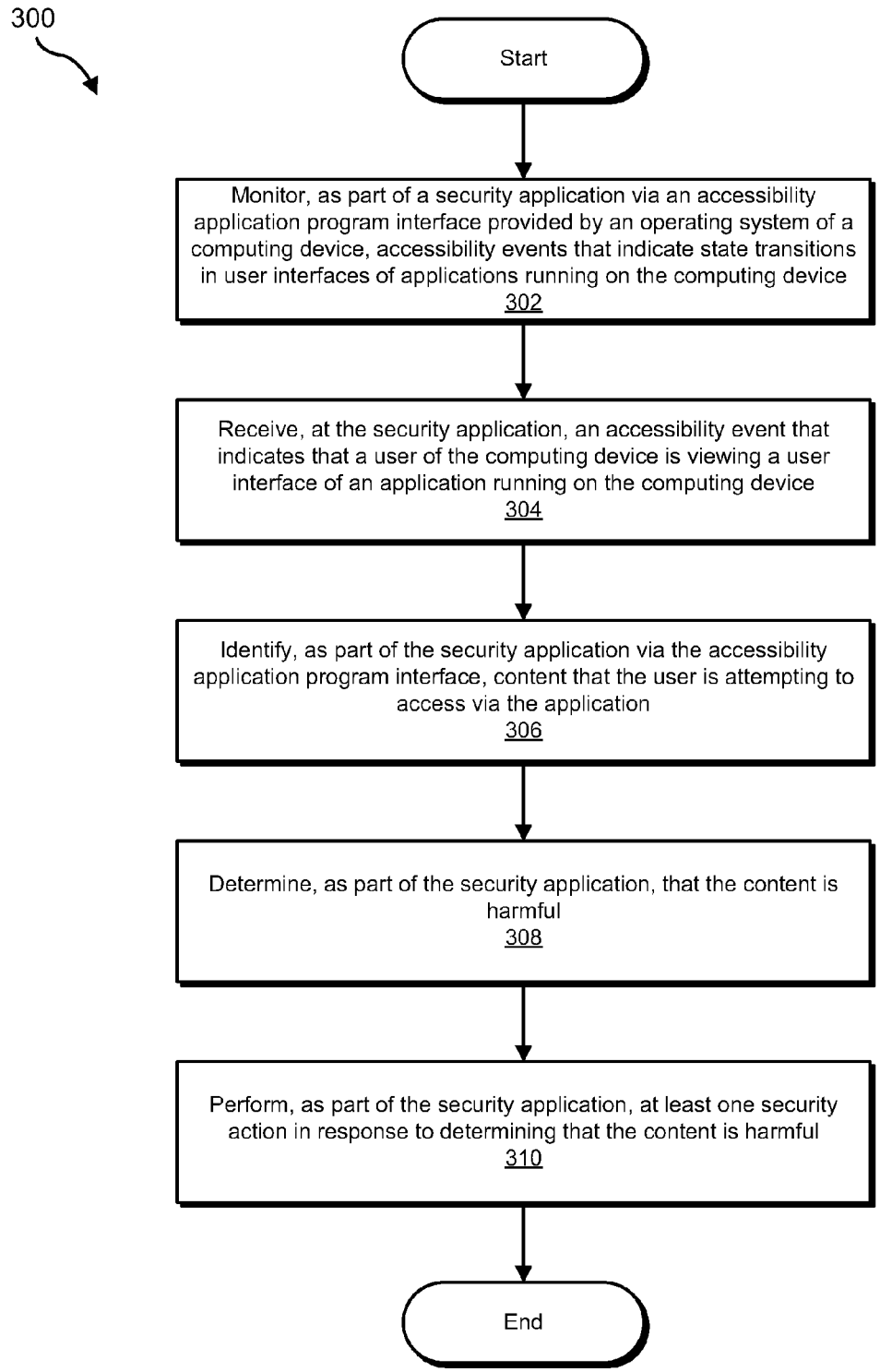
FIG. 3 is a flow diagram of an exemplary method for evaluating content provided to users via user interfaces.

FIG. 3 is a flow diagram of an exemplary computer-implemented method 300 for evaluating content provided to users via user interfaces. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may monitor, as part of a security application via an accessibility API provided by an operating system of a computing device, accessibility events that indicate state transitions in user interfaces of applications running on the computing device. For example, monitoring module 104 may, as part of a security application on computing device 202, monitor, via accessibility API 210, accessibility events 212 that indicate state transitions in user interfaces of applications running on computing device 202.

The term "accessibility event," as used herein, generally refers to any type or form of notification or message that contains information about one or more state transitions of a user interface. The phrase "state transition of a user interface," as used herein, generally refers to any type or form of change within a user interface and/or interaction between a user and a user interface. In some examples, a state transition of a user interface may occur as the result of a user providing input to the user interface, such as a user clicking a button within the user interface, changing the focus of the user interface (e.g., by zooming in), and/or entering text into an input field within the user interface. Additionally or alternatively, a state transition of a user interface may occur as the result of an application running on a computing device, such as text or audio content being displayed to a user, a new window of an application opening, and/or an application requesting user input. In some examples, an operating system of a computing device may detect and/or identify state transitions within the active window of the computing device. The term "active window" as used herein, generally refers to any user interface, notification, or audio-visual display that is currently presented to a user on the screen of a computing device.

In some embodiments, an operating system of a computing device may communicate details about state transitions in user interfaces by providing accessibility events to an accessibility service running on the computing device. The term "accessibility service," as used herein, generally refers to any type of form of application that monitors user interfaces of a computing device. Typically, an accessibility service may monitor user interfaces of a computing device in order to notify a user of the computing device about content within the user interfaces. For example, a typical accessibility service may assist users with audio or visual impairments (e.g., by reading text displayed on a screen, highlighting or enlarging certain elements of a user interface, etc.). Additionally or alternatively, a typical accessibility service may assist users who are temporarily unable to fully interact with their computing device. As will be explained in greater detail below, the systems described herein may be implemented as an accessibility service but may not act as a typical accessibility service.

Accessibility services may receive accessibility events containing any of a variety of information describing a state transition within a user interface. For example, an accessibility event may include the type of a state transition, the origin, source, and/or context of the state transition, specific text or elements involved in the state transition, the time at which the state transition occurred, and/or any additional information relevant to the state transition.

In some examples, an operating system of a computing device may automatically populate accessibility events with basic information such as the type of an event and/or the time at which the event occurred. Furthermore, in some examples, an accessibility service may request additional information to be included within an event, such as specific details about the source of an event and/or the elements within a user interface involved in an event.

In some embodiments, an operating system may provide accessibility events to an accessibility service via an accessibility API. The term "application program interface," as used herein, generally refers to any type or form of protocol, technique, or tool for interfacing applications and/or components of applications. An API may transfer information or data from one application to another, enable one application to integrate its functionality into another application, provide graphical user interfaces to users, enable an application to query another application for specific information, and/or perform any suitable function within or between software applications. The term "accessibility API," as used herein, generally refers to any type or form of API that facilitates the transfer of information associated with state transitions in user interfaces. As will be explained in greater detail below, an accessibility API may enable an accessibility service to receive accessibility events from an operating system and/or query an application about content displayed on a user interface of the application.

The systems described herein may monitor accessibility events in a variety of ways. In some examples, one or more of modules 102 (e.g., as all or a portion of a security application) may be configured and registered as an accessibility service or similar service. The security application may be configured as an accessibility service designed to operate on any of a variety of mobile and non-mobile platforms, such as ANDROID, iOS, WINDOWS, and/or UNIX systems. In some examples, the security application may be unable to receive accessibility events via an accessibility API before a user provides the security application with permissions required by an accessibility service. As such, monitoring module 104 may prompt a user to enable the required permissions (e.g., by displaying a pop-up window or notification within a user interface).

While all or a portion of the systems described herein may be implemented as a security application that is registered as an accessibility service, the systems described herein may not necessarily perform the duties typically associated with an accessibility service (e.g., providing user interface enhancements for disabled individuals). Instead, the systems described herein may leverage the framework of an accessibility service in order to monitor content provided to users via user interfaces.

After modules 102 are registered as a service that has access to an accessibility API, monitoring module 104 may receive accessibility events via the accessibility API. In some examples, the operating system of the computing device on which modules 102 are implemented may forward accessibility events to monitoring module 104 in response to each state transition that occurs within a user interface on the computing device. In other examples, monitoring module 104 may request only accessibility events that describe certain types of events. For example, monitoring module 104 may request accessibility events that indicate that a user is viewing user interfaces of applications that are known to or may potentially provide the user with harmful content, such as web browser applications, messaging applications (e.g., email, instant messaging, or Short Message Service (SMS) applications), application distribution platforms, media distribution platforms, social networking services, cloud-computing platforms, and/or any other suitable applications.

Returning to FIG. 3, at step 304 one or more of the systems described herein may receive, at the security application, an accessibility event that indicates that a user of the computing device is viewing a user interface of an application running on the computing device. For example, reception module 106 may, as part of computing device 202 in FIG. 2, receive, at the security application, accessibility event 213 that indicates that a user of computing device 202 is viewing user interface 216 of application 214.

The systems described herein may receive an accessibility event that indicates a user is viewing a user interface of an application in a variety of ways. In some examples, monitoring module 104 may forward all or a portion of accessibility events received via an accessibility API to reception module 106. In the event that monitoring module 104 did not request to only receive accessibility events associated with particular applications, reception module 106 may analyze accessibility events forwarded from monitoring module 104 to determine which accessibility events indicate that a user is viewing user interfaces of the particular applications. For example, reception module 106 may filter out accessibility events associated with applications unlikely to provide the user with access to harmful content, such as phone applications, calendar applications, word-processing applications, applications that do not access the internet, etc.

Upon receiving an accessibility event, reception module 106 may identify an application associated with the accessibility event in any suitable manner. In one embodiment, reception module 106 may identify an application by identifying a package name (e.g., a unique identifier assigned to an application within a computing device or download platform) within an accessibility event. Additionally or alternatively, reception module 106 may identify a name of an application, a publisher of an application, a version of an application, and/or any other identifier of an application within an accessibility event.

Figure 4:
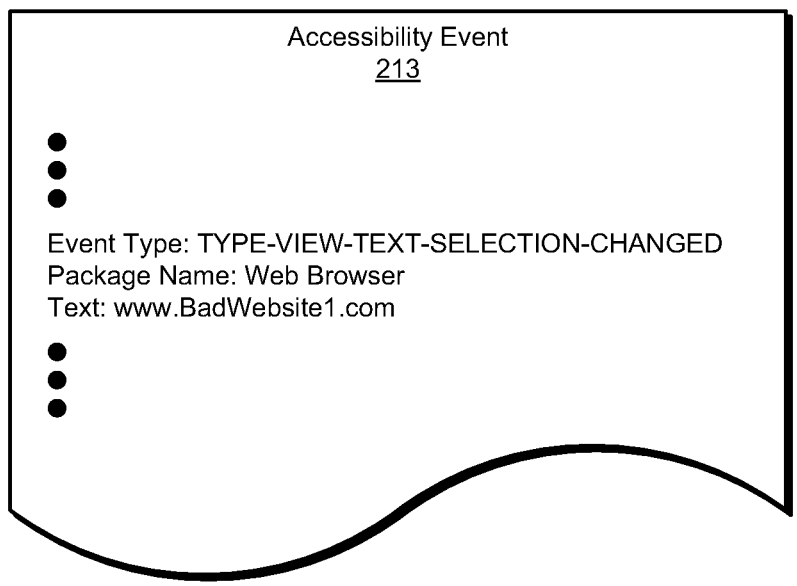
FIG. 4 is an illustration of an exemplary accessibility event.

As an example of receiving and analyzing an accessibility event, FIG. 4 illustrates a portion of the information that may be included within an exemplary accessibility event. In this example, accessibility event 213 may represent an accessibility event provided by an ANDROID operating system. As shown in FIG. 4, accessibility event 213 may include an event type of a state transition (in this example "TYPE-VIEW-TEXT-SELECTION-CHANGED"), a package name of the application involved in the state transition (in this example "Web Browser"), and text involved in the state transition (in this example "www.BadWebsite1.com"). Although not illustrated in FIG. 4, accessibility event 213 may also contain information such as the class name of the source of the event, the time of the event, the length of text involved in the event, and/or any additional type of information that may be included within an ANDROID accessibility event of the type "TYPE-VIEW-TEXT-SELECTION-CHANGED."

In the example illustrated in FIG. 4, reception module 106 may determine that application 214 is a web browser application based on identifying the package name "Web Browser" within accessibility event 213. Furthermore, reception module 106 may determine that accessibility event 213 describes the event of a user entering the text "www.BadWebsite1.com" within a user interface of the web browser application. Moreover, reception module 106 may determine that accessibility event 213 indicates that the user may be attempting to access harmful content based on determining that application 214 is a web browser application.

Figure 5:
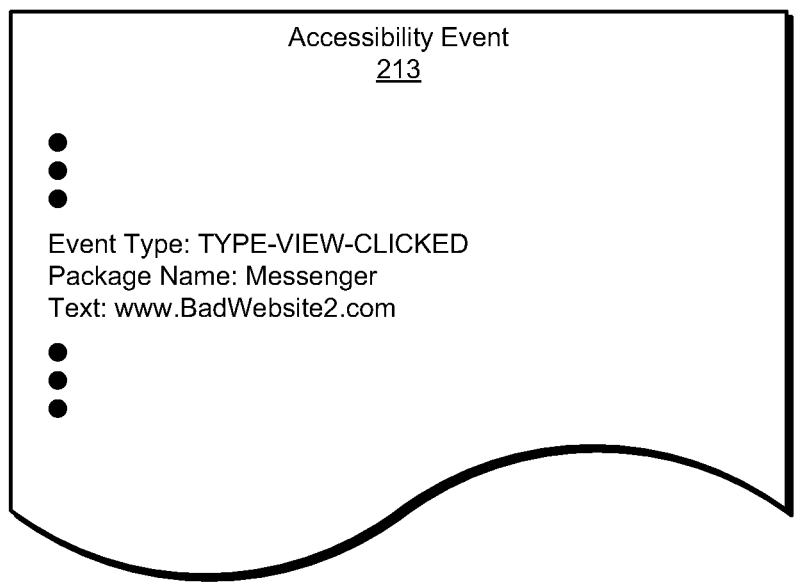
FIG. 5 is an illustration of an additional exemplary accessibility event.

FIG. 5 provides another example of a portion of the information that may be included within accessibility event 213. Similarly to accessibility event 213 within FIG. 4, accessibility event 213 within FIG. 5 may include an event type of a state transition (in this example "TYPE-VIEW-CLICKED"), a package name of the application involved in the state transition (in this example "Messenger"), and text involved in the state transition (in this example "www.BadWebsite2.com"). In this example, reception module 106 may determine that application 214 is a messenger application based on identifying the package name "Messenger" within accessibility event 213. Furthermore, reception module 106 may determine that accessibility event 213 describes the event of a user clicking on the text "www.BadWebsite2.com" within a user interface of the messenger application. Moreover, reception module 106 may determine that accessibility event 213 indicates that the user may be attempting to access harmful content based on determining that application 214 is a messenger application.

Returning to FIG. 3, at step 306 one or more of the systems described herein may identify, as part of the security application via the accessibility API, content that the user is attempting to access via the application. For example, identification module 108 may, as part of the security application within computing device 202, identify, via accessibility API 210, content 218 that the user is attempting to access via application 214.

The term "content," as used herein, generally refers to any type or form of media that may be accessed by a user via an application. Examples of content include, without limitation, text, websites, audio-visual files (e.g., videos, music, games, etc.), downloadable files, keywords, images, variations of one or more of the same, combinations of one or more of the same, and/or any additional type of content.

In some examples, content may be harmful to a user or computing device. The term "harmful content," as used herein, generally refers to any type or form of content that is or may potentially be detrimental to the safety, security, or well-being of a user or computing device. One example of harmful content may include a malicious file (e.g., spyware, adware, a Trojan horse, or other type of malware) that compromises the performance and/or integrity of a computing device. Another example of harmful content may include certain games, videos, or music that are inappropriate for young children. A further example of harmful content may include certain websites (e.g., FACEBOOK.COM, REDDIT.COM, etc.) that may negatively affect the productivity of employees in a workplace.

Users may access content in a variety of ways. In some examples, a user interface may directly provide a user with content. For example, as shown within FIG. 2, content 218 may reside within user interface 216. In this example, content 218 may represent an image, text, video, etc. currently displayed within user interface 216. However, in other examples, a user interface may represent a platform for accessing content. For example, as shown in FIG. 2, content 218 may reside within and/or be hosted by content server 208. In this example, user interface 216 may provide a path or link that enables the user to access content 218 on content server 208.

The systems described herein may identify content that a user is attempting to access via an application in a variety of ways. In some embodiments, identification module 108 may identify content in response to determining that a user is viewing a user interface of an application that may provide the user with harmful content. For example, after determining that an application associated with an accessibility event may provide the user with harmful content, identification module 108 may analyze the accessibility event and/or a user interface of the application to identify potentially harmful content the user is attempting to access.

In some examples, identification module 108 may identify content based on information included within an accessibility event. For example, identification module 108 may determine that an accessibility event specifies text that a user has entered into a user interface. Identification module 108 may then determine that the entered text identifies content that the user is attempting to access. Referring to the example of FIG. 4, identification module 108 may determine that accessibility event 213 indicates that the user has entered the text "www.BadWebsite1.com" into user interface 216. As a result, identification module 108 may determine that content 218 is a website with the URL "www.BadWebsite1.com."

In another example, identification module 108 may identify, within an accessibility event, an element that a user has clicked on within a user interface. Identification module 108 may then determine that the element that the user has clicked on provides the user with access to certain content. Referring to the example of FIG. 5, identification module 108 may determine that accessibility event 213 indicates that the user has clicked on the link "www.BadWebsite2.com" within user interface 216. As a result, identification module 108 may determine that content 218 is a website with the URL "www.BadWebsite2.com."

In addition to or instead of analyzing information within an accessibility event, identification module 108 may identify content by analyzing a user interface that a user is viewing. For example, identification module 108 may query, via an accessibility API, a user interface to identify an element within the user interface that is known to identify content. Identification module 108 may then identify the content within the identified element.

As an example, identification module 108 may determine that an accessibility event indicates that a user has entered text into a web browser application. However, identification module 108 may determine that the accessibility event does not specify the entered text. As such, identification module 108 may query a user interface of the web browser application to identify an address bar of the web browser application. Identification module 108 may then identify text entered into the address bar in order to identify the URL of the website the user is attempting to access.

Identification module 108 may apply a variety of analyses, via an accessibility API, to a user interface to identify content that a user is attempting to access. In some examples, identification module 108 may analyze a user interface based at least in part on characteristics of an application associated with an accessibility event and/or characteristics of a computing device on which the application is running. For example, identification module 108 may determine that different types of applications and/or different types of computing devices display certain elements in different positions within user interfaces. As such, identification module 108 may search for elements within user interfaces in places that may be more likely to contain the elements. As an example, identification module 108 may determine that one version of a messaging application displays text boxes on a different side of the screen than another version of the messaging application. As another example, identification module 108 may determine that a small computing device (e.g., a smartphone) may display elements within a user interface in a different configuration than a larger computing device (e.g., a laptop or desktop computer). In general, identification module 108 may identify any property or characteristic of an application or computing device (e.g., within an accessibility event or from an additional source) that may indicate the position of an element within a user interface. Identification module 108 may then use the information about the position of the element to accurately and efficiently identify the element and/or content provided by the element.

Figure 6:
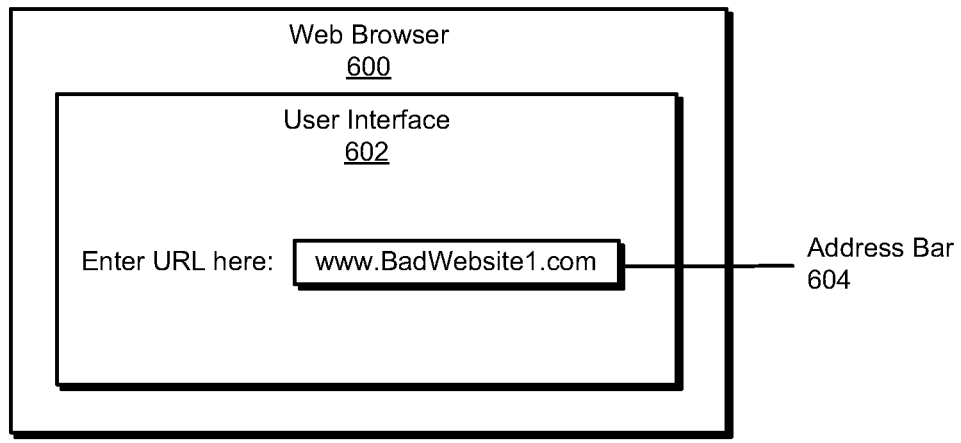
FIG. 6 is an illustration of an exemplary user interface.

As an example of identifying content within a user interface, FIG. 6 illustrates a web browser 600 that displays a user interface 602. In this example, web browser 600 may correspond to the web browser application identified within accessibility event 213 as illustrated in FIG. 4. As shown in FIG. 6, user interface 602 may contain an address bar 604. In this example, identification module 108 may know that web browser 600 includes address bar 604 and may query user interface 602 for the text contained in address bar 604. In this example, identification module 108 may identify the URL "www.BadWebsite1.com" within address bar 604.

Figure 7:
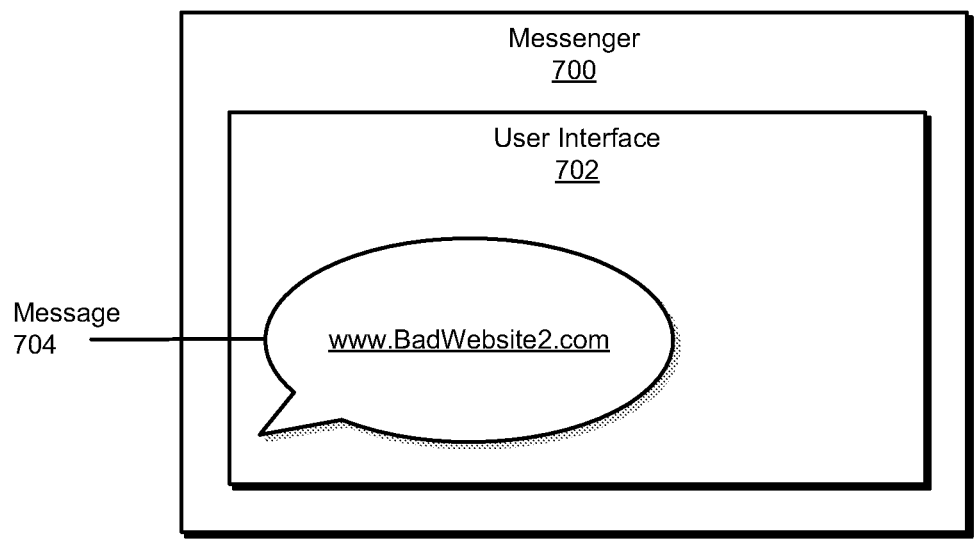
FIG. 7 is an illustration of an additional exemplary user interface.

As another example, FIG. 7 illustrates a messenger 700 that displays a user interface 702. In this example, messenger 700 may correspond to the messenger application identified within accessibility event 213 as illustrated in FIG. 5. As shown in FIG. 7, user interface 702 may contain a message 704. In this example, identification module 108 may know that messenger 700 includes message 704 and may query user interface 702 for the text contained in message 704. In this example, identification module 108 may identify the URL "www.BadWebsite2.com" within message 704.

Returning to FIG. 3, at step 308 one or more of the systems described herein may determine, as part of the security application, that the content is harmful. For example, determination module 110 may, as part of the security application within computing device 202, determine that content 218 is harmful.

The systems described herein may determine that content is harmful in a variety of ways. In some examples, a security server (such as security server 206 in FIG. 2) may store reputations of various forms of content. In these examples, determination module 110 may query the security server for an indication of the reputation of the content that the user is attempting to access. In some embodiments, determination module 110 may receive, from a security server, an indication that certain content has a "bad," "malicious," "inappropriate," or otherwise harmful reputation. Additionally or alternatively, determination module 110 may receive, from a security server, an indication that accessing certain content violates one or more policies stored within the security server.

In some embodiments, determination module 110 may determine that content is harmful by identifying the content on a blacklist of content that a user is restricted from accessing. As an example, determination module 110 may determine that content that a user is attempting to access is listed on a blacklist provided by a parental control policy that prohibits a child from accessing content containing certain keywords. Additionally or alternatively, determination module 110 may determine that content is harmful by determining that the content is not listed within a whitelist of content that a user is allowed to access. A blacklist and/or whitelist used to determine that content is harmful may be maintained within a computing device of a user, within a security server, and/or within any additional device or database. Moreover, determination module 110 may determine that content is harmful by performing any additional or alternative analysis on the content, such as by performing a heuristic analysis, by performing a malware analysis, and/or by comparing a hash of the content with hashes of content known to be harmful.

As an example of determining that content is harmful, determination module 110 may determine that the website with the URL "www.BadWebsite1.com" illustrated in FIGS. 4 and 6 is known to host malware. For example, determination module 110 may query security server 206 for a reputation of the website with the URL "www.BadWebsite1.com." Determination module 110 may then receive, from security server 206, an indication that the reputation of the website is "malicious."

In the example of FIGS. 5 and 7, determination module 110 may determine that a user is restricted from accessing the website with the URL "www.BadWebsite2.com." For example, determination module 110 may determine that a blacklist stored within a computing device of the user identifies the website with the URL "www.BadWebsite2.com" as a website blocked for user-access based on an administrative policy implemented by an enterprise that manages the computing device.

Returning to FIG. 3, at step 310 one or more of the systems described herein may perform, as part of the security application, at least one security action in response to the determination that the content is harmful. For example, performance module 112 may, as part of the security application on computing device 202, perform at least one security action in response to the determination that content 218 is harmful.

The systems described herein may perform a security action in a variety of ways. For example, performance module 112 may perform any suitable action on identified harmful content and/or an application that provides harmful content in order to mitigate the potential threat posed by the harmful content and/or reduce the probability that a user or computing device is exposed to the harmful content.

In some examples, performance module 112 may perform a security action by preventing a user from accessing harmful content. For example, in the event that the systems described herein determine that a user is attempting to download a harmful file, performance module 112 may block an operating system of the user's computing device or an installer application on the user's computing device from downloading and/or installing the file. In the event that the systems described herein determine that a user is attempting to access a harmful website (as in the examples of FIGS. 4-7), performance module 112 may attempt to prevent a web browser on the user's computing device from loading the website. In some embodiments, a web browser may be able to render a harmful website more quickly than the systems described herein can determine that the website is harmful (e.g., due to latencies incurred while querying a security server for a reputation of the website). In such embodiments, performance module 112 may block content within the website after the web browser has rendered the website.

Additionally or alternatively, performance module 112 may perform a security action by re-directing a user to alternative content. In the event that the systems described herein determine that a user is attempting to access a harmful website, performance module 112 may direct the user to a web page that contains an error message or to a website that is known to not provide harmful content. In the event that the systems described herein determine that a user is attempting to download a harmful file, performance module 112 may suggest or provide alternative files to download.

In some examples, performance module 112 may notify a user that content he or she is attempting to access is harmful. For example, performance module 112 may provide a graphical user interface that alerts a user about potential threats associated with harmful content and/or policies violated by accessing the harmful content. Additionally or alternatively, performance module 112 may prompt a user to manually choose whether to continue to access harmful content. In some examples, in the event that a web browser application rendered a harmful website before performance module 112 was able to block the website, performance module 112 may alert a user that the website the user is currently viewing is harmful.

Furthermore, in some embodiments, performance module 112 may notify an administrator of a computing device that harmful content has been identified on the computing device. For example, in the event that a security policy implemented on a computing device within an organization has been violated, performance module 112 may notify an IT administrator of the organization. In the event that a parental-control policy has been violated, performance module 112 may notify the parent or guardian responsible for establishing the policy.

Performance module 112 may identify the security action to perform in a variety of ways. In some examples, performance module 112 may receive the security action from a security server (such as security server 206). Specifically, the security server may distribute, to a computing device of a user, an appropriate security action to perform along with an indication that content the user is attempting to access is harmful. In other examples, performance module 112 may identify a security action within a database stored on a computing device of a user and/or receive the security event from any additional database or server.

The systems described herein may be implemented in a variety of ways and provide a number of advantages. As explained above, by monitoring accessibility events provided by an operating system of a computing device via an accessibility API, the systems and methods described herein may analyze state transitions in user interfaces of applications running on the computing device. Specifically, the disclosed systems and methods may identify state transitions that indicate a user is attempting to access potentially harmful content. For example, the disclosed systems and methods may determine that a user is viewing an inappropriate image, has directed a web browser to load a restricted website, or has clicked on a link to download a malicious file. As such, the disclosed systems and methods may quickly and efficiently identify harmful content that a user is viewing or is about to access and prevent the content from compromising the safety, security, and/or well-being of the user and their computing device.

Figure 8:
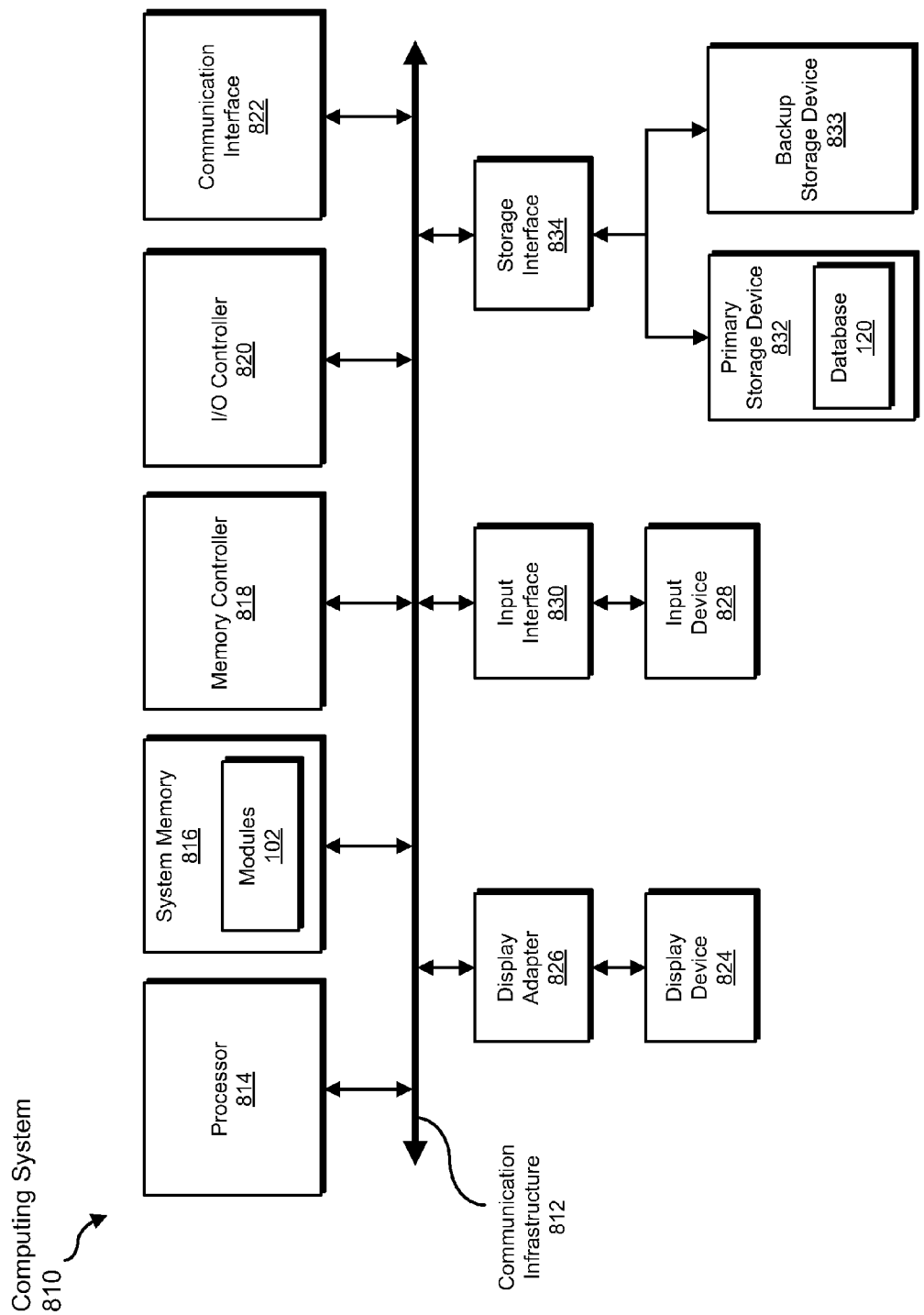
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810.

Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
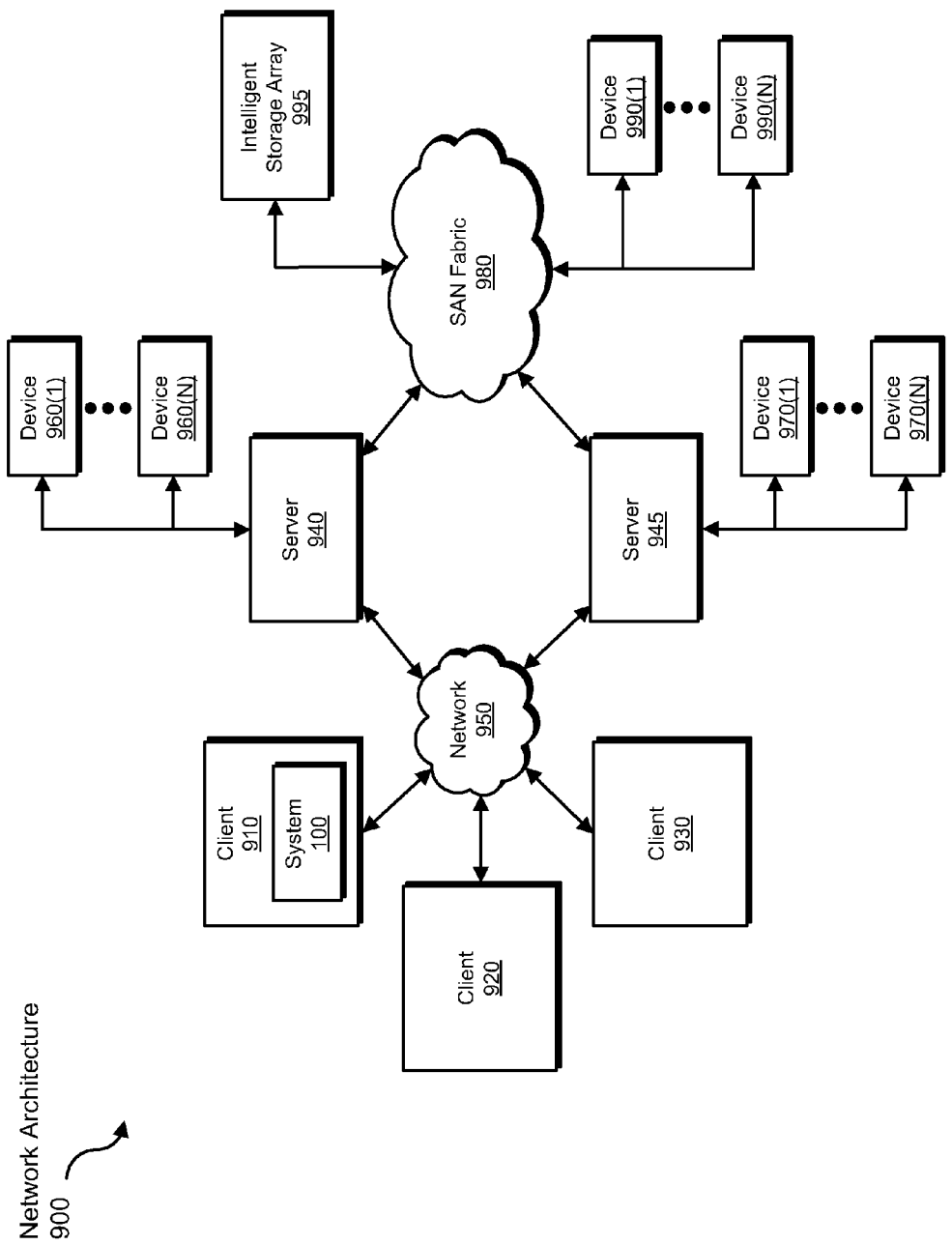
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for evaluating content provided to users via user interfaces.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an accessibility event from an operating system of a computing device, transform the accessibility event into a harmful content detection, output a result of the transformation to a user of the computing device, use the result of the transformation to prevent the user of the computing device from accessing harmful content, and store the result of the transformation in a database or server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating content provided to users via user interfaces, at least a portion of the method being performed by a computing device comprising at least one processor, the method comprising:
   monitoring, as part of a security application via an accessibility application program interface provided by an operating system of the computing device, accessibility events designed to provide user interface enhancements for users with impairments by describing state transitions in user interfaces of applications running on the computing device;
   receiving, at the security application, an accessibility event that indicates that a user of the computing device is viewing a user interface of an application running on the computing device;
   identifying, as part of the security application via the accessibility application program interface, content that the user is attempting to access via the application;
   determining, as part of the security application, that the content is harmful; and
   in response to determining that the content is harmful, performing, as part of the security application, at least one security action to prevent the harmful content from compromising the computing device.

2. The method of claim 1, wherein:
   receiving the accessibility event that indicates that the user is viewing the user interface of the application comprises receiving an accessibility event that indicates that the user is viewing a user interface of a web browser application;
   identifying the content that the user is attempting to access via the application comprises identifying a website that the user is attempting to access via the web browser application;
   determining that the content is harmful comprises determining that the website is known to provide harmful content; and
   performing the security action comprises preventing the user from accessing the website.

3. The method of claim 1, wherein identifying the content that the user is attempting to access comprises:
   identifying, within the accessibility event, text that the user has entered into the user interface of the application; and
   determining that the text identifies the content.

4. The method of claim 3, wherein:
   the text that the user has entered into the user interface of the application comprises a uniform resource locator of a website; and
   determining that the text identifies the content comprises identifying the website.

5. The method of claim 1, wherein identifying the content that the user is attempting to access comprises:
   identifying, within the accessibility event, an element that the user has clicked on within the user interface of the application; and
   determining that the element provides the user with access to the content.

6. The method of claim 5, wherein:
   the element that the user has clicked on within the user interface comprises a link that directs the user to a website; and
   determining that the element provides the user with access to the content comprises identifying the website.

7. The method of claim 1, wherein identifying the content that the user is attempting to access comprises:

querying, via the accessibility application program interface, the user interface of the application to identify an element within the user interface that is known to identify the content; and identifying the content within the element.

8. The method of claim 7, wherein:

the element within the user interface that is known to identify the content comprises an address bar of a web browser application into which the user has entered a uniform resource locator of a website; and identifying the content within the element comprises identifying the website.

9. The method of claim 1, wherein determining that the content is harmful comprises querying a remote database to identify a reputation of the content that indicates that the content is harmful.

10. The method of claim 1, wherein determining that the content is harmful comprises at least one of:

determining that the content violates a security policy;

determining that the content violates a parental-control policy; and determining that the content violates an administrative policy.

11. The method of claim 1, wherein performing the security action comprises at least one of:

preventing the user from accessing the content;

re-directing the user to alternative content;

notifying the user that the content is harmful; and notifying an administrator of the computing device that harmful content has been identified.

12. The method of claim 1, wherein identifying the content that the user is attempting to access comprises identifying at least one of:

a link;

a keyword;

an image;

an audio-visual file; and a downloadable file.

13. A system for evaluating content provided to users via user interfaces, the system comprising:

a monitoring module, stored in memory, that monitors, as part of a security application via an accessibility application program interface provided by an operating system of a computing device, accessibility events designed to provide user interface enhancements for users with impairments by describing state transitions in user interfaces of applications running on the computing device;

a reception module, stored in memory, that receives, at the security application, an accessibility event that indicates that a user of the computing device is viewing a user interface of an application running on the computing device;

an identification module, stored in memory, that identifies, as part of the security application via the accessibility application program interface, content that the user is attempting to access via the application;

a determination module, stored in memory, that determines, as part of the security application, that the content is harmful;

a performance module, stored in memory, that performs, as part of the security application in response to the determination that the content is harmful, at least one security action to prevent the harmful content from compromising the computing device; and at least one physical processor configured to execute the monitoring module, the reception module, the identification module, the determination module, and the performance module.

14. The system of claim 13, wherein:

the reception module receives the accessibility event that indicates that the user is viewing the user interface of the application by receiving an accessibility event that indicates that the user is viewing a user interface of a web browser application;

the identification module identifies the content that the user is attempting to access via the application by identifying a website that the user is attempting to access via the web browser application;

the determination module determines that the content is harmful by determining that the website is known to provide harmful content; and the performance module performs the security action by preventing the user from accessing the website.

15. The system of claim 13, wherein the identification module identifies the content that the user is attempting to access by:

identifying, within the accessibility event, text that the user has entered into the user interface of the application; and determining that the text identifies the content.

16. The system of claim 15, wherein:

the text that the user has entered into the user interface of the application comprises a uniform resource locator of a website; and the identification module determines that the text identifies the content by identifying the website.

17. The system of claim 13, wherein the identification module identifies the content that the user is attempting to access by:

identifying, within the accessibility event, an element that the user has clicked on within the user interface of the application; and determining that the element provides the user with access to the content.

18. The system of claim 17, wherein:

the element that the user has clicked on within the user interface comprises a link that directs the user to a website; and the identification module determines that the element provides the user with access to the content by identifying the website.

19. The system of claim 13, wherein the identification module identifies the content that the user is attempting to access by:

querying, via the accessibility application program interface, the user interface of the application to identify an element within the user interface that is known to identify the content; and identifying the content within the element.

20. A non-transitory computer-readable medium comprising one or more computer-executable instructions that, when executed by at least one processor of a computing device, cause the computing device to:

monitor, as part of a security application via an accessibility application program interface provided by an operating system of the computing device, accessibility events designed to provide user interface enhancements for users with impairments by describing state transitions in user interfaces of applications running on the computing device;

receive, at the security application, an accessibility event that indicates that a user of the computing device is viewing a user interface of an application running on the computing device;

identify, as part of the security application via the accessibility application program interface, content that the user is attempting to access via the application;

determine, as part of the security application, that the content is harmful; and in response to determining that the content is harmful, perform, as part of the security application, at least one security action to prevent the harmful content from compromising the computing device.

\* \* \* \* \*